US009390508B2

(12) United States Patent  
Ukil et al.

(10) Patent No.: US 9,390,508 B2  
(45) Date of Patent: Jul. 12, 2016

(54) METHOD, APPARATUS AND COMPUTER PROGRAM PRODUCT FOR DISPARITY MAP ESTIMATION OF STEREO IMAGES

(71) Applicant: Nokia Corporation, Espoo (FI)

(72) Inventors: Soumik Ukil, Bangalore (IN); Veldandi Muninder, San Jose, CA (US); Krishna Annasagar Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/617,348

(22) Filed: Feb. 9, 2015

(65) Prior Publication Data

US 2015/0248769 A1   Sep. 3, 2015

(30) Foreign Application Priority Data

Mar. 3, 2014 (IN) .......................... 1083/CHE/2014

(51) Int. Cl.
*G06K 9/00* (2006.01)
*G06T 7/00* (2006.01)

(52) U.S. Cl.
CPC ..... *G06T 7/0075* (2013.01); *G06T 2207/10012* (2013.01); *G06T 2207/10024* (2013.01); *G06T 2207/20072* (2013.01); *G06T 2207/20076* (2013.01)

(58) Field of Classification Search
CPC ... G06T 7/0075; G06T 7/0097; G06T 7/0081; G06T 7/408; G06T 2207/10012; H04N 13/0022
USPC .......................................................... 382/154
See application file for complete search history.

(56) References Cited

U.S. PATENT DOCUMENTS

| 5,917,937 | A | 6/1999 | Szeliski et al. |
| 8,411,934 | B2 | 4/2013 | Zhang et al. |
| 2005/0286756 | A1* | 12/2005 | Hong ............. G06K 9/20 382/154 |
| 2012/0321172 | A1 | 12/2012 | Jachalsky et al. |

(Continued)

FOREIGN PATENT DOCUMENTS

| RU | 2419880 C2 | 5/2011 |
| WO | 2012/177166 A1 | 12/2012 |

OTHER PUBLICATIONS

Extended European Search Report received for corresponding European Patent Application No. 15155166.0, dated Jul. 31, 2015, 7 pages.

(Continued)

*Primary Examiner* — Ruiping Li
(74) *Attorney, Agent, or Firm* — Nokia Technologies Oy

(57) ABSTRACT

In an example embodiment a method, apparatus and computer program product are provided. The method includes facilitating receipt of a first and a second image. A first and a second aggregated cost volume associated with pixels of the first and the second images are determined for a plurality of disparity values. A first and a second disparity maps are generated based on the first and the second aggregated cost volume. A confidence map for disparity values of the first image is generated based on the first aggregated cost volume. One or more infinity regions in the first image are determined based on a number of confident pixels in color segments of the first image. A third disparity map is generated by determining filtered disparity values for the pixels of the first image where filtered disparity values for pixels of the one or more infinity regions are a pre-defined disparity value.

22 Claims, 11 Drawing Sheets

(56) References Cited

U.S. PATENT DOCUMENTS

2013/0259360 A1 10/2013 Bingrong et al.
2013/0314409 A1 11/2013 Guseva
2014/0009462 A1* 1/2014 McNamer ............... G06T 19/20
345/419

OTHER PUBLICATIONS

Qingxiong, "A Non-Local Cost Aggregation Method for Stereo Matching", IEEE Conference on Computer Vision and Pattern Recognition, Jun. 16-21, 2012, 8 pages.

Yang et al., "Full-Image Guided Filtering for Fast Stereo Matching", IEEE Signal Processing Letters, vol. 20, No. 3, Mar. 2013, pp. 237-240.

Yang et al., "Near Real-time Stereo for Weakly Textured Scenes", Proceedings of the British Machine Conference, Sep. 2008, 10 Pages.

Mei et al., "Segment-Tree Based Cost Aggregation for Stereo Matching", IEEE Conference on Computer Vision and Pattern Recognition, Jun. 23-28, 2013, pp. 313-320.

* cited by examiner

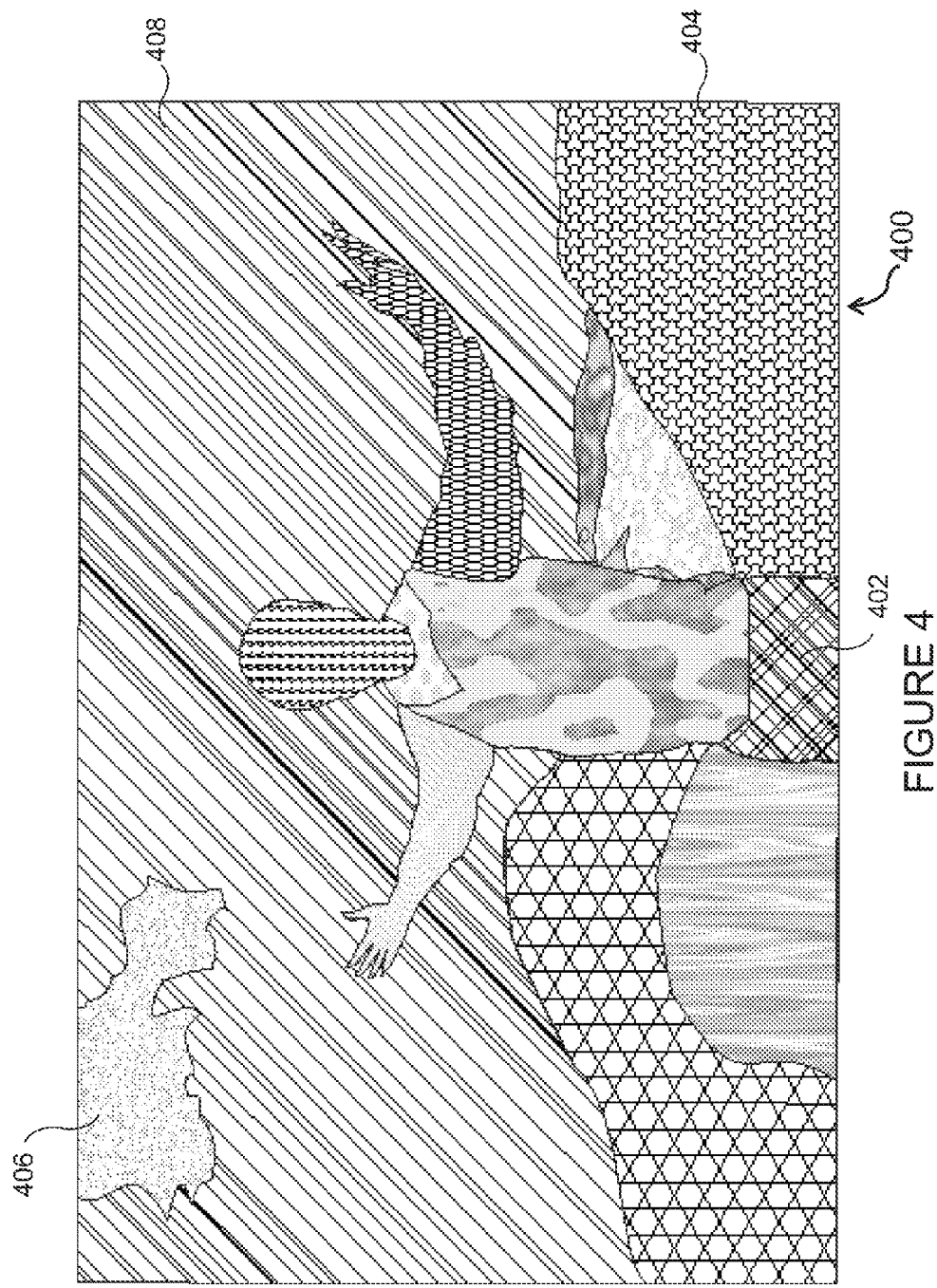

METHOD, APPARATUS AND COMPUTER PROGRAM PRODUCT FOR DISPARITY MAP ESTIMATION OF STEREO IMAGES

TECHNICAL FIELD

Various implementations relate generally to method, apparatus, and computer program product for disparity map estimation of stereo images.

BACKGROUND

Various electronic devices, for example, cameras, mobile phones, and other multimedia devices are widely used for capturing image of a scene. Some electronic devices are capable of capturing stereoscopic images, and performing disparity map estimation of the scene using the stereoscopic images. Disparity map estimation is a process that determines shifts in pixels between the stereoscopic images. Oftentimes, the disparity map includes incorrect disparities around object contours and missing disparities represented as holes and textureless regions. Normally, refining and filling of disparities in the disparity map are performed using a variety of methods, such as a minimum spanning tree (MST) based aggregation framework, a horizontal/vertical based aggregation framework or the like. However, refining the object contours and resolving errors in disparity estimation due to holes and textureless regions has been a challenge.

SUMMARY OF SOME EMBODIMENTS

Various aspects of examples embodiments are set out in the claims.

In a first aspect, there is provided a method comprising: facilitating receipt of a first image and a second image, the first image and the second image being associated with a scene; determining a first aggregated cost volume associated with pixels of the first image for a plurality of disparity values, and determining a second aggregated cost volume associated with pixels of the second image for the plurality of disparity values; generating a first disparity map of the first image based on the first aggregated cost volume and generating a second disparity map of the second image based on the second aggregated cost volume; generating a confidence map for disparity values of the pixels of the first image in the first disparity map based on the first aggregated cost volume, the confidence map representing a set of confident pixels from the pixels of the first image; determining one or more infinity regions in the first image based at least on a plurality of color segments of the first image and a number of confident pixels in the plurality of color segments; and generating a third disparity map based on the first disparity map by determining filtered disparity values for the pixels of the first image, wherein filtered disparity values for pixels of the one or more infinity regions in the first image are determined as a pre-defined disparity value.

In a second aspect, there is provided an apparatus comprising at least one processor; and at least one memory comprising computer program code, the at least one memory and the computer program code configured to, with the at least one processor, cause the apparatus to perform at least: facilitate receipt of a first image and a second image, the first image and the second image being associated with a scene; determine a first aggregated cost volume associated with pixels of the first image for a plurality of disparity values, and determining a second aggregated cost volume associated with pixels of the second image for the plurality of disparity values; generate a first disparity map of the first image based on the first aggregated cost volume and generating a second disparity map of the second image based on the second aggregated cost volume; generate a confidence map for disparity values of the pixels of the first image in the first disparity map based on the first aggregated cost volume, the confidence map representing a set of confident pixels from the pixels of the first image; determine one or more infinity regions in the first image based at least on a plurality of color segments of the first image and a number of confident pixels in the plurality of color segments; and generate a third disparity map based on the first disparity map by determining filtered disparity values for the pixels of the first image, wherein filtered disparity values for pixels of the one or more infinity regions in the first image are determined as a pre-defined disparity value.

In a third aspect, there is provided a computer program product comprising at least one computer-readable storage medium, the computer-readable storage medium comprising a set of instructions, which, when executed by one or more processors, cause an apparatus to perform at least: facilitate receipt of a first image and a second image, the first image and the second image being associated with a scene; determine a first aggregated cost volume associated with pixels of the first image for a plurality of disparity values, and determining a second aggregated cost volume associated with pixels of the second image for the plurality of disparity values; generate a first disparity map of the first image based on the first aggregated cost volume and generating a second disparity map of the second image based on the second aggregated cost volume; generate a confidence map for disparity values of the pixels of the first image in the first disparity map based on the first aggregated cost volume, the confidence map representing a set of confident pixels from the pixels of the first image; determine one or more infinity regions in the first image based at least on a plurality of color segments of the first image and a number of confident pixels in the plurality of color segments; and generate a third disparity map based on the first disparity map by determining filtered disparity values for the pixels of the first image, wherein filtered disparity values for pixels of the one or more infinity regions in the first image are determined as a pre-defined disparity value.

In a fourth aspect, there is provided an apparatus comprising: means for facilitating receipt of a first image and a second image, the first image and the second image being associated with a scene; means for facilitating receipt of a first image and a second image, the first image and the second image being associated with a scene; means for determining a first aggregated cost volume associated with pixels of the first image for a plurality of disparity values, and determining a second aggregated cost volume associated with pixels of the second image for the plurality of disparity values; means for generating a first disparity map of the first image based on the first aggregated cost volume and generating a second disparity map of the second image based on the second aggregated cost volume; means for generating a confidence map for disparity values of the pixels of the first image in the first disparity map based on the first aggregated cost volume, the confidence map representing a set of confident pixels from the pixels of the first image; means for determining one or more infinity regions in the first image based at least on a plurality of color segments of the first image and a number of confident pixels in the plurality of color segments; and means for generating a third disparity map based on the first disparity map by determining filtered disparity values for the pixels of the first image, wherein filtered disparity values for pixels of the one or more infinity regions in the first image are determined as a pre-defined disparity value.

In a fifth aspect, there is provided a computer program comprising program instructions which when executed by an apparatus, cause the apparatus to: facilitate receipt of a first image and a second image, the first image and the second image being associated with a scene; determine a first aggregated cost volume associated with pixels of the first image for a plurality of disparity values, and determining a second aggregated cost volume associated with pixels of the second image for the plurality of disparity values; generate a first disparity map of the first image based on the first aggregated cost volume and generating a second disparity map of the second image based on the second aggregated cost volume; generate a confidence map for disparity values of the pixels of the first image in the first disparity map based on the first aggregated cost volume, the confidence map representing a set of confident pixels from the pixels of the first image; determine one or more infinity regions in the first image based at least on a plurality of color segments of the first image and a number of confident pixels in the plurality of color segments; and generate a third disparity map based on the first disparity map by determining filtered disparity values for the pixels of the first image, wherein filtered disparity values for pixels of the one or more infinity regions in the first image are determined as a pre-defined disparity value.

BRIEF DESCRIPTION OF THE FIGURES

Various embodiments are illustrated by way of example, and not by way of limitation, in the figures of the accompanying drawings in which:

FIG. 4 illustrates an example representation of a plurality of color segments of the first image, in accordance with an example embodiment;

DETAILED DESCRIPTION

Example embodiments and their potential effects are understood by referring to FIGS. 1 through 8A-8B of the drawings.

Figure 1:
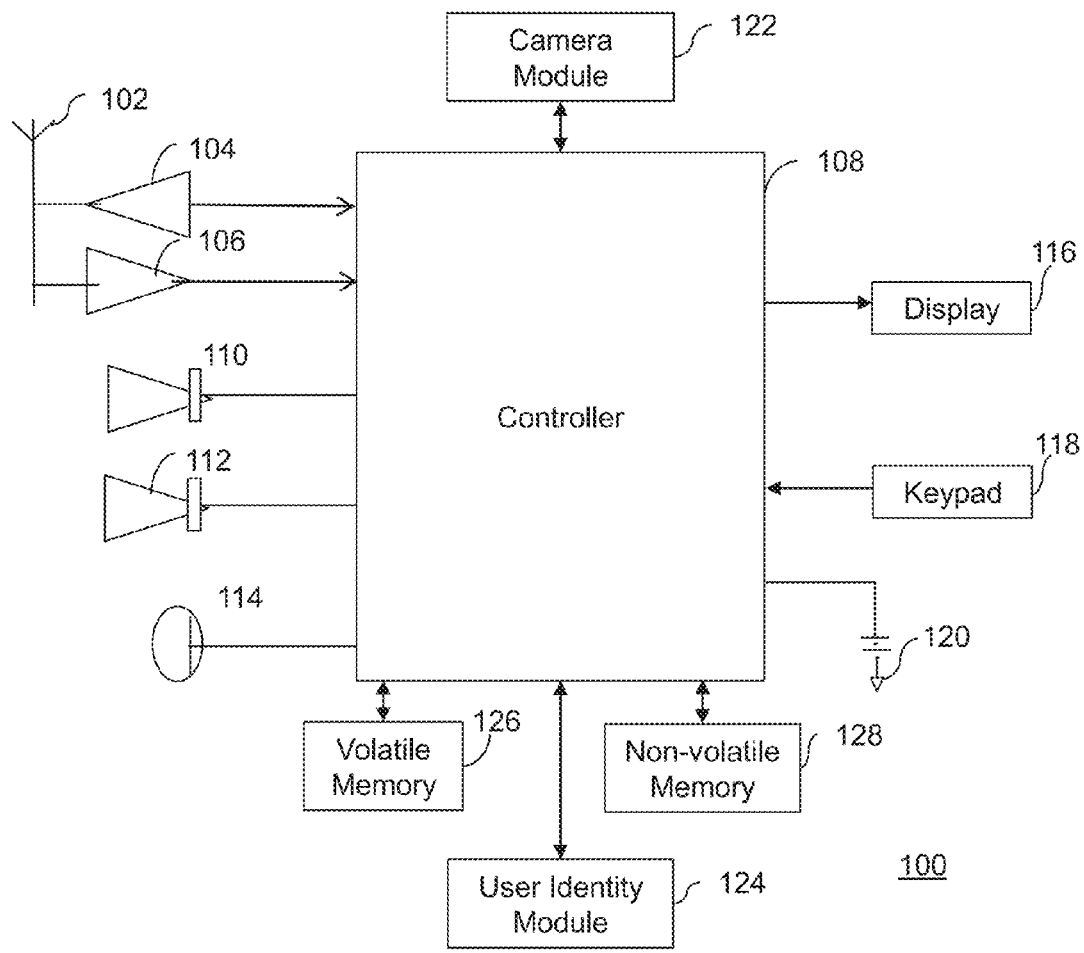
FIG. 1 illustrates a device, in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively or additionally, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software for creating a digital image file from a captured image. Alternatively, the camera module 122 may include the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile random access memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
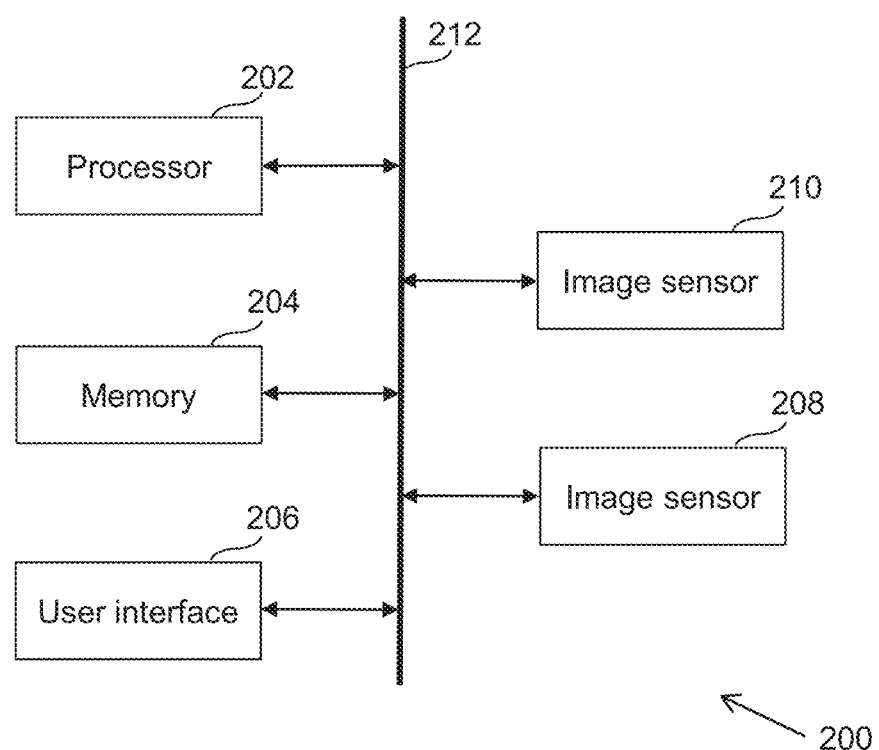
FIG. 2 illustrates an apparatus for disparity map estimation of stereo images, in accordance with an example embodiment.

FIG. 2 illustrates an apparatus 200 for disparity map estimation of stereo images, in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. Alternatively, embodiments may be employed on a combination of devices including, for example, those listed above. Accordingly, various embodiments may be embodied wholly at a single device, for example, the device 100 or in a combination of devices. Furthermore, it should be noted that the devices or elements described below may not be mandatory and thus some may be omitted in certain embodiments.

The apparatus 200 includes or otherwise is in communication with at least one processor 202 and at least one memory 204. Examples of the at least one memory 204 include, but are not limited to, volatile and/or non-volatile memories. Some examples of the volatile memory include, but are not limited to, random access memory, dynamic random access memory, static random access memory, and the like. Some examples of the non-volatile memory include, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data comprising media content for processing by the processor 202. Additionally or alternatively, the memory 204 may be configured to store instructions for execution by the processor 202.

An example of the processor 202 may include the controller 108. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include, but are not limited to, input interface and/or output interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include an electronic device. Some examples of the electronic device include communication device, media capturing device with or without communication capabilities, computing devices, and the like. Some examples of the electronic device may include a mobile phone, a personal digital assistant (PDA), and the like. Some examples of computing device may include a laptop, a personal computer, and the like. In an example embodiment, the electronic device may include a user interface, for example, the user interface 206, having user interface circuitry and user interface software configured to facilitate a user to control at least one function of the electronic device through use of a display and further configured to respond to user inputs. In an example embodiment, the electronic device may include a display circuitry configured to display at least a portion of the user interface 206 of the electronic device. The display and display circuitry may be configured to facilitate the user to control at least one function of the electronic device.

In an example embodiment, the electronic device may be embodied as to include a transceiver. The transceiver may be any device operating or circuitry operating in accordance with software or otherwise embodied in hardware or a combination of hardware and software. For example, the processor 202 operating under software control, or the processor 202 embodied as an ASIC or FPGA specifically configured to perform the operations described herein, or a combination thereof, thereby configures the apparatus or circuitry to perform the functions of the transceiver. The transceiver may be configured to receive media content. Examples of the media content may include audio content, video content, data, and a combination thereof.

In an example embodiment, the electronic device may be embodied as to include a plurality of image sensors, such as an image sensor 208 and image sensor 210. Though only two image sensors 208 and 210 are shown in the example representation of FIG. 2, but the electronic device may include more than two image sensors. The image sensors 208 and 210 may be in communication with the processor 202 and/or other components of the apparatus 200. The image sensors 208 and 210 may be in communication with other imaging circuitries and/or software, and are configured to capture digital images or to capture video or other graphic media. The image sensors 208 and 210 and other circuitries, in combination, may be example of at least one camera module such as the camera module 122 of the device 200. In an example embodiment, the image sensors 208 and 210 may be accompanied with corresponding lenses to capture two views of the scene, such as stereoscopic views. In another example embodiment, there may be only one image sensor 208 or 210 embodied or otherwise accessible to the apparatus 200, that can capture stereoscopic pair of images of the scene by capturing two images of the scene from different positions (or from different angles).

These components (202-210) may communicate to each other via a centralized circuit system 212 to facilitate disparity map estimation of stereo images. The centralized circuit system 212 may be various devices configured to, among other things, provide or enable communication between the components (202-210) of the apparatus 200. In certain embodiments, the centralized circuit system 212 may be a central printed circuit board (PCB) such as a motherboard, main board, system board, or logic board. The centralized circuit system 212 may also, or alternatively, include other printed circuit assemblies (PCAs) or communication channel media.

In an example embodiment, the apparatus 200 is caused to perform disparity map estimation of stereo images. In this example embodiment, the processor 202 is configured to, with the content of the memory 204, and optionally with other components described herein, to cause the apparatus 200 to facilitate receipt of a first image, and a second image. In this example embodiment, the first image (interchangeably used as 'image I1') and the second image (interchangeably used as 'image I2') are associated with a scene. Herein, the 'scene' refers to arrangement (natural, manmade, sorted or assorted) of one or more objects of which the images or videos can be captured, or of which the preview can be generated. In this example embodiment, the first image and the second image are stereoscopic pair of images of the scene captured by a device (for example, a camera module including image sensor 208 and 210). In this example embodiment, the first image and the second image are captured by the sensors 208 and 210 present or otherwise accessible to the apparatus 200. Herein, the 'stereoscopic pair of images' refer to two images of the scene captured from slightly horizontally separated points thereby generating a left view image and a right view image of the scene. In some example embodiments, the first image and the second image may be prerecorded or stored in the apparatus 200, or may be received from sources external to the apparatus 200. In such example embodiments, the apparatus 200 is caused to receive the first image and the second image from external storage medium such as DVD, Compact Disk (CD), flash drive, memory card, or from external storage locations through Internet, Bluetooth®, and the like. In an example embodiment, a processing means may be configured to facilitate capture of the first image and the second image of the scene. An example of the processing means may include the processor 202, which may be an example of the controller 108, and the image sensors 208 and 210.

In an example embodiment, the processor 202 is configured to, with the content of the memory 204, and optionally with other components described herein, to cause the apparatus 200 to determine a first aggregated cost volume associated with pixels of the first image for a plurality of disparity values, and the apparatus 200 is further caused to determine a second aggregated cost volume associated with pixels of the second image for the plurality of disparity values. In an example embodiment, the first aggregated cost volume is determined by computing a cost volume between the pixels of the first image and corresponding pixels of the second image for the plurality of disparity values. In an example embodiment, the cost volume is a set of matching costs for each pixel of the image I1 and corresponding pixel of the image I2, where each matching cost corresponds to a disparity value (from the plurality of disparity values). In an example embodiment, the second aggregated cost volume is determined by computing a cost volume which for an image, for example image I2. In this example embodiment, the cost volume includes n number of matching costs for corresponding pixels of the images (I1 and I2) calculated for n number of disparity values. In an example, a matching cost may refer to a degree of similarity (or distance) between two corresponding pixels in the images I1 and I2, where the degree of similarity (or distance) is measured in terms of intensity, color, or other image features. In an example, the cost volume is computed using a color difference method between the pixels in the image I1 and the pixels in the image I2.

In an example embodiment, the processor 202 is configured to, with the content of the memory 204, and optionally with other components described herein, to cause the apparatus 200 to determine the first aggregated cost volume and the second aggregated cost volume based on a tree based aggregation method (for example, a segment tree method or a minimum spanning tree method) or a non-tree based aggregation method (for example, a horizontal and vertical guided image based aggregation and the like). In an example embodiment, the apparatus 200 is caused to aggregate the cost volume based on a first segment tree to determine the first aggregated cost volume, and the apparatus 200 is caused to aggregate the cost volume based on a second segment tree to determine the second aggregated cost volume. In an example embodiment, for an image, for example, the image I1, aggregated costs are performed for each pixel (that is represented by node in the first segment tree) of the image I1 at each of the plurality of disparity values (d1, d2 ... dn) to generate the first aggregated cost volume. Similarly, in an example embodiment, the image I2, the aggregated costs are performed for each pixel (that is represented by node in the second segment tree) of the image I2 at each of the plurality of disparity values (d1, d2 ... dn) to generate the second aggregated cost volume. In an example, the segment trees (the first segment tree and the second segment tree) and first aggregated cost volume and the second aggregated cost volume are determined using a cost aggregation method as set forth in Qingxiong Yang, "A Non-Local Cost Aggregation Method for Stereo Matching," in *CVPR*2012, pp. 1402-1409, and in Mei, Xing et al. "Segment-Tree based Cost Aggregation for Stereo Matching" in *Computer Vision and Pattern Recognition (CVPR), 2013 IEEE Conference on IEEE,* 2013. In an example embodiment, a processing means may be configured to determine the first aggregated cost volume associated with the pixels of the image I1 and the second aggregated cost volume associated with the pixels of the image I2. An example of the processing means may include the processor 202, which may be an example of the controller 108.

In an example embodiment, the apparatus 200 is caused to generate a first disparity map of the first image based on the first aggregated cost volume and the apparatus 200 is caused to generate a second disparity map of the second image based on the second aggregated cost volume. The term 'disparity' refers to difference in disparity values between corresponding pixels of stereoscopic images (for example, the first image and the second image). In an example embodiment, the cost aggregation method is performed on the first image to determine the first aggregated cost volume which outputs the first disparity map. Similarly, in an example embodiment, the cost aggregation method is performed on the second image to determine the second aggregated cost volume which outputs the second disparity map. The first disparity map and the second disparity map are generated using the cost aggregation method as set forth in Qingxiong Yang, "A Non-Local Cost Aggregation Method for Stereo Matching," in *CVPR*2012, pp. 1402-1409. In an example embodiment, a processing means may be configured to generate the first disparity map of the image I1 and the second disparity map of the image I2. An example of the processing means may include the processor 202, which may be an example of the controller 108.

In an example embodiment, the apparatus 200 is caused to generate a confidence map for disparity values of the pixels of the first image in the first disparity map based on the first aggregated cost volume. In an example embodiment, the confidence map represents a set of confident pixels and a set of non-confident pixels of the first image. In an example embodiment, for generating the confidence map, the apparatus 200 is caused to determine confidence values corresponding to the disparity values for the pixels of the first image in the first disparity map based on the first aggregated cost volume. In an example, the confidence map represents confidence values for distinguishing the set of confident pixels and the set of non-confident pixels in the image I1. In an example, the apparatus 200 is caused to compute a confidence value for each pixel in the first disparity map based on the first aggregated cost volume. In an example embodiment, the confidence value for a pixel (p) of the image I1 is calculated based on the expression (1) given below:

$$C(p) = \frac{1}{\sum_{d \neq d_p} e^{\frac{-(A(p,d)-A(p,d_p))^2}{\sigma^2}}} \quad (1)$$

where, C(p) is the confidence value for the pixel p, $d_p$ is a disparity value for the pixel p, A(p,d) is the first aggregated cost volume for the pixel p at a disparity d (where d varies for the plurality of disparity values d1, d2 ... dn except $d_p$) and σ is a constant.

In an example embodiment, for generating the confidence map, the apparatus 200 is further caused to normalize the confidence values corresponding to the disparity values for the pixels of the first image to generate normalized confidence values such that for a textureless region (within the first image) having a flat cost curve, the normalized confidence gives a value of zero. In an example embodiment, the confidence value of a pixel of the first disparity map may be normalized by performing a subtraction of an offset cost which is determined as a confidence value computed over a flat cost curve value. The normalized confidence value for a pixel (p) associated with the first image is given by an expression (2) below:

$$C'(p) = C(p) - \frac{1}{L-1} \quad (2)$$

where C'(p) is the normalized confidence value for the pixel p, C(p) is the confidence value for the pixel p, and L is a number of disparities in the first image.

In an example embodiment, for generating the confidence map, the apparatus 200 is further caused to compare the normalized confidence values with a confidence threshold to assign a binary confidence value to the pixels of the first image. In an example embodiment, the confidence threshold may be selected by tuning the constant σ (parameter sigma) which can be experimentally computed. For instance, the confidence threshold may be selected within the pre-determined confidence range 0-1 (for example, 0.75). In this example, the normalized confidence value is compared to the confidence threshold (for example, 0.75) each pixel of the first image. The normalized confidence values for the pixels that are below the confidence threshold (for example, 0.75) are assigned a binary value '0' and the normalized confidence values that are above the confidence threshold (for example, 0.75) are assigned a binary value '1'. In an example embodiment, each pixel of the first image is assigned with the binary confidence value (the binary values '0' or '1') to realize the confidence map. Herein, the confidence map may be also referred to as 'the binary confidence map' as the confidence values for the pixels in the confidence map are realized in form of the binary values '0' and '1'. In this example, the value '0' in the confidence map represents the set of non-confident pixels and the value '1' in the confidence map represents the set of confident pixels. In an example embodiment, a processing means may be configured to generate the confidence map for the pixels of the first image based on the first aggregated cost volume. An example of the processing means may include the processor 202, which may be an example of the controller 108.

In an example embodiment, the apparatus 200 is caused to determine one or more infinity regions in the first image based on a plurality of color segments of the first image, and a number of confident pixels in the plurality of color segments. For instance, if in a color segment of the plurality of color segments, a number of confident pixels is more than a threshold percentage of total pixels present in the color segment, the color segment may be determined as an infinity region. In an example embodiment, the term 'infinity region' in an image refers to a region in the image where pixels associated with the region maybe considered to have zero disparity values. Examples of the infinity regions may include, but are not limited to, low texture regions or textureless regions associated with objects for example, sky, plain walls and the like. In an example embodiment, the apparatus 200 is caused to determine the plurality of color segments associated with the first image of the scene based on a variety of segmentation methods. In an example embodiment, color segmentation of an image refers to a process where the pixels having same intensity value are grouped together to form a segment such that each segment represents a homogeneous color. The plurality of color segments may be determined by various suitable techniques, such as, but are not limited to, a mean shift tree (MST) based segmentation, a segment tree based segmentation and the like.

In another example embodiment, for determining the one or more infinity regions in the first image, the apparatus 200 is caused to determine occlusion pixels in the first disparity map. In an example, the apparatus 200 is caused to determine the occlusion pixels in the image I1 based on comparing the first disparity map and the second disparity map. In this example, the pixels from the first disparity map and the pixels from the second disparity map are subjected to a mutual consistency check (also referred to as a left right (LR) check) to determine the occlusion pixels. It should be noted that the number of confident pixels may be determined from the confidence map determined with the help of expressions (1) and (2). In an example embodiment, a processing means may be configured to determine the number of occlusion pixels based on comparing the first disparity map and the second disparity map. In this example embodiment, for determining the one or more infinity regions in the first image, the apparatus 200 is caused to define the one or more infinity regions based on sizes of the plurality of color segments of the first image, the number of confident pixels and a number of occlusion pixels in the plurality of color segments. In an example embodiment, a processing means may be configured to determine occlusion pixels in the first disparity maps, and define the one or more infinity regions based on sizes of the plurality of color segments of the first image, the number of confident pixels and a number of occlusion pixels in the plurality of color segments. An example of the processing means may include the processor 202, which may be an example of the controller 108.

In an example embodiment, for defining the one or more infinity regions, the apparatus 200 is caused to determine a set of color segments from the plurality of color segments of the first image by comparing sizes of the plurality of color segments with a threshold size. For instance, the threshold size may be 2% of size of the first image. The threshold size (2%) is mentioned only as a representation purpose and should not be considered as limiting as the threshold size may be of any value. In an example embodiment, the apparatus 200 is caused to compare each color segment of the plurality of color segments with the threshold size to check whether the sizes of the plurality of color segments is higher than the threshold size or not. If the size of a color segments is higher than the threshold size, the apparatus 200 is caused to select the color segment as a part of the set of color segments.

In an example embodiment, for defining the one or more infinity regions, the apparatus 200 is caused to calculate ratios of a first factor and a second factor for the set of color segments. In an example embodiment, the first factor for an individual color segment of the set of color segments is calculated based on the number of confident pixels in the individual color segment that are not occlusion pixels and the second factor for the individual color segment is calculated based on total pixels in the individual color segment that are not the occlusion pixels. The apparatus 200 is caused to classify one or more color segments of the set of color segments as the one or more infinity regions based on comparing the ratios with a threshold ratio. In an example representation, the first factor is calculated based on an expression $C_N=C-O_C$, where $C_N$ is the first factor, C is the number of confident pixels in a color segment S, O is the number of occlusion pixels in the color segment S and $O_C$ is computed based on an expression $O_C=O \cap C$ (O intersection C), where $O_C$ is the number of occlusion pixels within the confident pixels in the color segment S. In an example embodiment, the first factor ($C_N$) denotes the number of confident pixels in the color segment S that are not occlusion pixels. Further, the second factor ($S_N$) is calculated based on an expression $S_N=S-O_C$. In an example embodiment, the second factor $S_N$ denotes total pixels in the color segment S that are not the occlusion pixels. In an example embodiment, for determining the one or more infinity regions, the apparatus 200 is caused to calculate ratios between the first factor and the second factor for each of the set of color segments. In an example representation, for the color segment S of the set of color segments, the ratio is calculated based on an expression $Ts=|C_N|/|S_N|$, where Ts is the ratio between the first factor ($C_N$) and the second factor ($S_N$) for the color segment S.

In an example embodiment, for defining the one or more infinity regions, the apparatus 200 is caused to classify one or more color segments of the set of color segments as the one or more infinity regions based on comparing the ratios (of the first factor and the second factor) calculated for the set of color segments with a threshold ratio. In an example embodiment, the color segment S may be classified as the infinity region based on checking whether the ratio Ts is less than or greater than the threshold ratio. For instance, if the ratio Ts is less than the threshold ratio, the color segment S is classified as an infinity region. In an example embodiment, the apparatus 200 is caused to set disparity values for pixels of the one or more infinity regions in the first image as equal to a predefined disparity value (for example, 0 or 1). For instance, in an example embodiment, the disparity values for the pixels in the one or more infinity regions may be set as zero (0). In an example embodiment, if the ratio Ts is greater than or equal to the threshold ratio, the color segment S is considered to have more number of confident pixels as compared to non-confident pixels. In an example embodiment, in such cases where the ratio Ts is greater than or equal to the threshold ratio, the non-confident pixels in the color segment S are classified as occlusion holes. In an example embodiment, a processing means may be configured to determine the one or more infinity regions. An example of the processing means may include the processor 202, which may be an example of the controller 108.

In an example embodiment, the apparatus 200 is caused to generate a third disparity map based on the first disparity map by determining disparity values for the pixels of the first image based on a tree based aggregation method. In an example embodiment, the third disparity map is a refined (filtered) disparity map obtained from the first disparity map. In an example embodiment, the apparatus 200 is caused to perform filtering of the first disparity map along with filling of missing disparities in the first disparity map and resolving the one or more infinity regions in the first image. In an example embodiment, filtering of the first disparity map is performed where new disparity values (also termed as 'filtered disparity values') for the pixels of the first disparity map are determined. In an example embodiment, the disparity value for a pixel p is computed based on an expression (3):

$$d_p = \frac{1}{N_p} \sum_{q \in I1} e^{-\frac{D(p,q)}{\sigma}} d_q b_q \qquad (3)$$

where $d_p$ is the filtered disparity value for the pixel p, $d_q$ is a disparity value of a pixel q of the image I1 (the first image), D(p,q) is the distance between the pixel p and the pixel q in the first segment tree, $b_q$ is a binary value of the pixel q associated with the confidence map, Np is a normalizing term for the pixel p, and σ is a constant. In an example embodiment, the normalizing term $N_p$ is determined based on an expression (4):

$$N_p = \sum_{q \in I} e^{-\frac{D(p,q)}{\sigma}} b_q \qquad (4)$$

From the above expression (3), it should be noted that the filtered disparity value for the pixel p is calculated based on the disparity values of other pixels q in the image I1 and the distances between the pixels q and the pixel p along the first segment tree. It should further be noted that the disparity values of pixels belonging to the one or more infinity regions are hard-coded to zero (0) disparity value before performing the filtering (for example, applying the expression (3)). For instance, $d_q$ is zero for all the pixels that belong to the one or more infinity regions, and hence the pixels belonging to the one or more infinity regions do not have any effect on the filtering process (in determining $d_p$). It should be further noted that the binary value $b_q$ for the pixel q is set as zero (0) if q is an occlusion hole and the binary value $b_q$ for the pixel q is set as one (1) if q are the pixels belonging to the confident pixels or the pixels belonging to the one or more infinity regions.

In the expression (3), the term $b_q$ represents a binary value of the pixel q where q represents for all pixels in the image I1. In an example embodiment, the $b_{q\ (q \in I1)}$ represents a binary mask that is applied in the expression (3) to calculate the filtered disparity values for the pixels of the image I1. It should be noted that $b_q$ is zero for the occlusion pixels/holes in the image I1 and $b_q$ is one for the pixels that have valid disparities in the first image. In an example embodiment, for all the pixels belonging to the one or more infinity regions $b_q$ is also one. It should further be noted that in an example embodiment, the filtered disparity value for the pixels belonging to the one or more disparity levels are hard coded to zero (0), and for these pixels belonging to the infinity regions, the expression (3) is not used. In another example embodiment, as the binary mask associated with the one or more infinity regions has been applied to the first disparity map, the filtering is performed on pixels belonging to the first disparity map that are other than the pixels in the one or more infinity regions. The pixels in the one or more infinity regions does not have any effect on the filtering process as the disparity values of the one or more infinity regions is zero.

In various example embodiment, the new disparity values (the filtered disparity values) for the pixels of the first image (other than the pixels belonging to the infinity regions) are determined based on the expression (3); and for the pixels belonging to the infinity regions, the new disparity values are set as a uniform values, for example, zero (0). It should further be noted that by using the expression (3), disparity values for the pixels belonging to the occlusion holes or occlusion pixels are also determined. For instance, for a pixel belonging to the occlusion holes, the disparity value for the pixel is determined using the disparity values of other valid pixels (confident pixels) of the image I1 and their distances from the pixel in the first segment tree. In an example embodiment, in a single step by running the expression (3), the filtered disparity values for the confident pixels as well as the disparity values for the occlusion pixels, the non-confident pixels and pixels belonging to the occlusion holes are determined. Accordingly, the third disparity map is generated based on the filtered disparity values for the pixels of the image I1, and is a refined disparity map obtained based on the first disparity map.

In another example embodiment, the apparatus 200 is caused to generate the third disparity map based on the first disparity map by determining disparity values for the pixels (other than the pixels of the infinity regions) of the first image based on a "full image guided filtering method". In an example embodiment, the apparatus 200 is caused to perform the 'full image guided filtering' by calculating weights using horizontal and vertical aggregation in the first image to guide the filtering of the disparity values of the pixels of the first image. One such example of the "full image guided filtering method" is set forth in Qingxiong Yang, "Full-Image Guided Filtering for Fast Stereo Matching" in *IEEE signal processing letters*, Vol. 20, No. 3, March 2013. In this example embodiment, the disparity values for the pixels of the first image that are other than the pixels belonging to the infinity regions, are filtered using the "full image guided filtering method", and disparity values for the pixels belonging to the infinity regions are assigned with the pre-defined disparity values (for example, zero disparity) in the third disparity map.

Figure 3A:
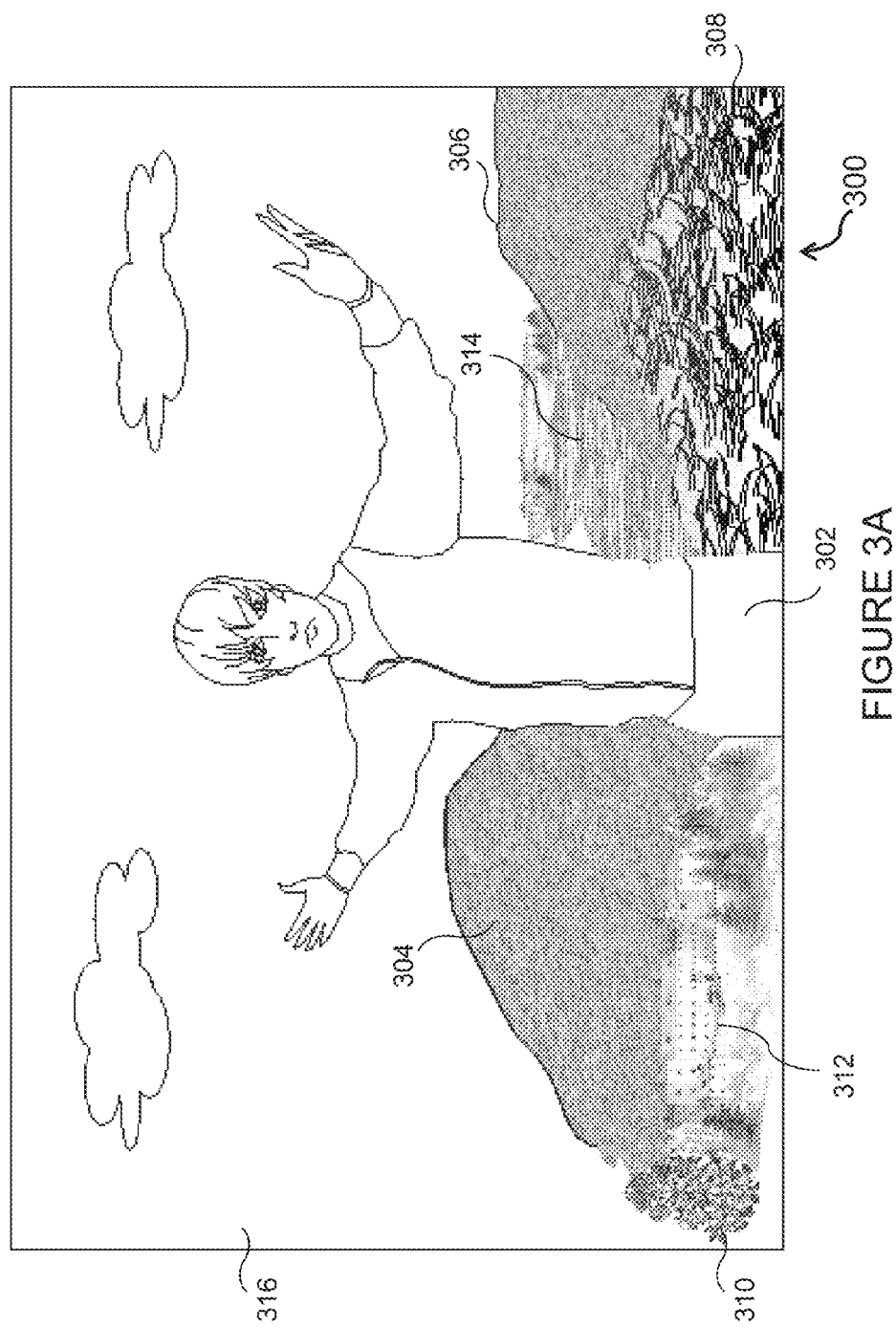
FIG. 3A illustrates an example representation of a first image of the stereo images, in accordance with an example embodiment.
Figure 3B:
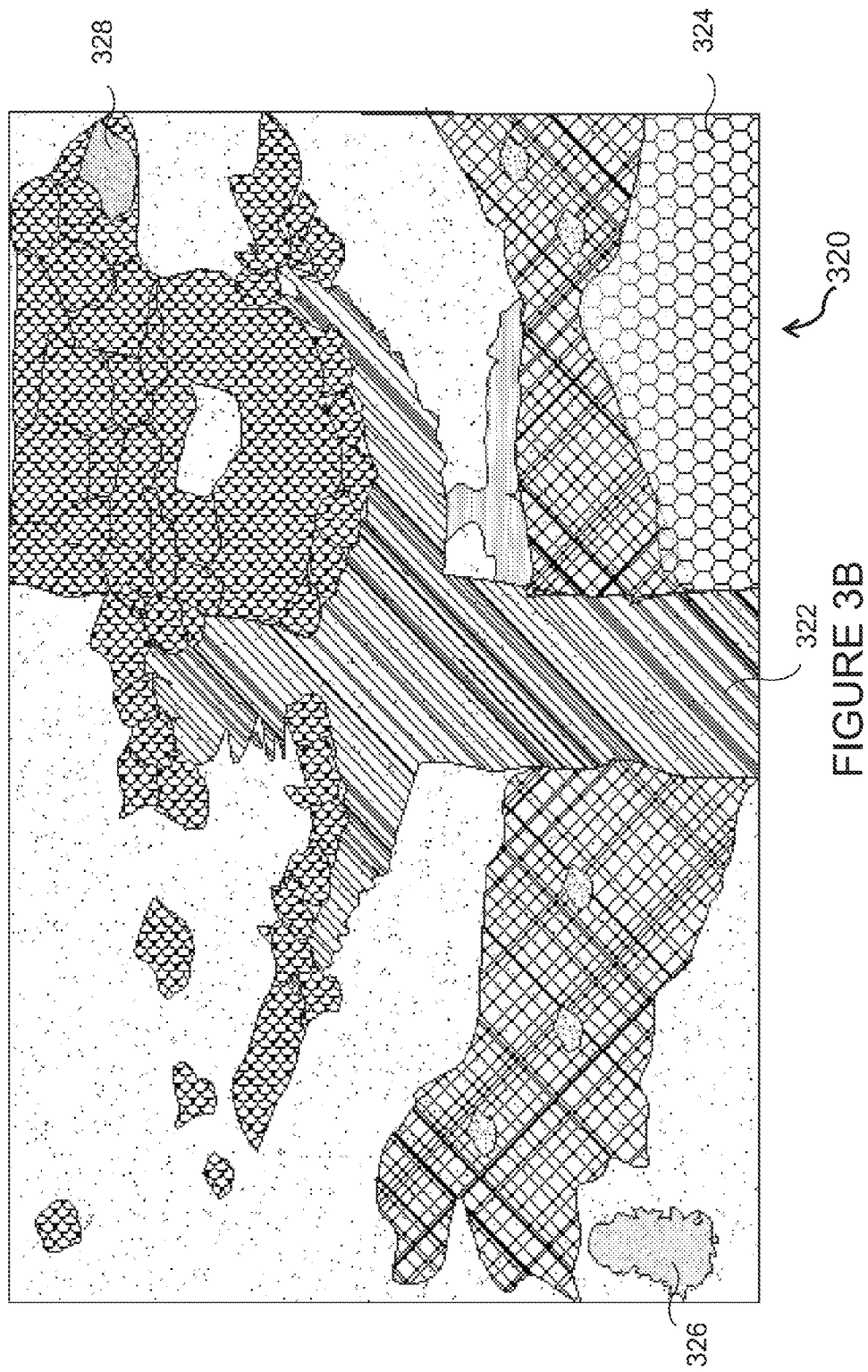
FIG. 3B illustrates an example disparity map of the first image, in accordance with an example embodiment.
Figure 6:
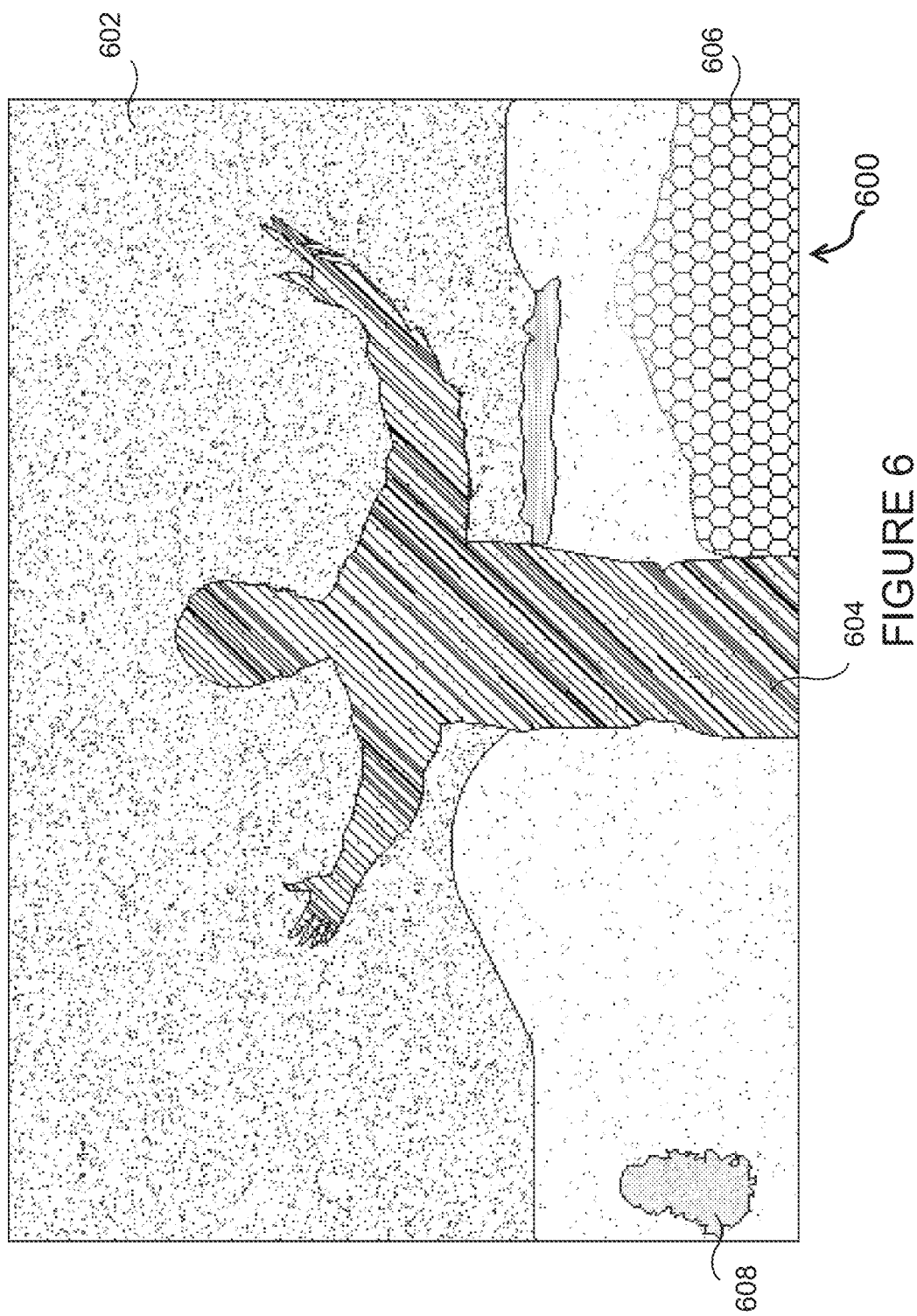
FIG. 6 illustrates a refined disparity map generated based on the first disparity map, in accordance with an example embodiment.

Some example representation of estimation of the third disparity map are further described in FIGS. 3A-3B to 6, and these representation for example purposes only and should not be considered as limiting to the scope of various embodiments.

FIG. 3A illustrates an example representation of a first image 300, in accordance with an example embodiment. In an example embodiment, the first image 300 may be one of a left view image or a right view image of the stereoscopic pair of images. As illustrated in FIG. 3A, the first image 300 may be considered as the right view image. In an example embodiment, a stereo camera may be utilized to capture the first image 300 and the second image (not shown) of the stereoscopic pair of images. In an example embodiment, the first image 300 may be captured by a media capturing module, such as the camera module 122 of the device 100 (FIG. 1) or the sensor such as the sensors 208 and 210 along with other components of the apparatus 200 (FIG. 2). In other examples, the first image 300 may be captured by camera such as multi-baseline cameras, array cameras, light-field cameras and plenoptic cameras that are capable of capturing the stereoscopic pair of images.

In an example embodiment, the first image 300 comprises objects having different disparities with respect to the second image. For example, as illustrated in FIG. 3A, the first image 300 includes objects such as a person 302, mountains represented by numerals 304 and 306, grass 308, a tree 310, a building 312, a water body 314, and sky 316 in the background, where pixel regions in each object may have different disparities with respect to the second image. In an example embodiment, the disparity values of the pixels of objects in the first image 300 may be determined inform of a disparity map associated with the first image 300. The disparity map associated with the first image 300 is shown in FIG. 3B.

FIG. 3B illustrates an example disparity map 320 of the first image 300, in accordance with an example embodiment. It should be noted that the example representation 320 is shown for example purposes only; and its aim is not to represent an accurate disparity map associated with the image 300 as shown in FIG. 3A, but to facilitate description of some example embodiments only. In an example embodiment, the disparity map 320, such as the first disparity map (as explained with reference to FIG. 2), includes information of disparity values associated with pixels of various objects in the first image 300. For example, the first disparity map 320 of the first image 300 is shown to include different regions 322, 324, 326 and 328 where each region has different disparities. The regions 322, 324, 326, and 328 are indicated by varying shading of the regions 322, 324, 326, and 328 to represent different disparities for these regions, and such representation is for example purposes only. For instance, some parts of the region 322 may have a disparity value of 50, and some parts of the region 324 may have a disparity value of 20. Similarly, the second image may also be associated with a disparity map (not shown), such as the second disparity map (as explained with reference to FIG. 2) which includes disparity information associated with the various objects in the second image.

In an example embodiment, the first disparity map, such as the disparity map 320 may include few regions with invalid disparities (for example, low textured regions) and few regions with missing disparities (also referred to as 'occlusion holes'). Further, objects shown in the disparity map 320 may not have consistent contours. For the purposes of representations, regions for example the regions 322 and 324 in the disparity map 320 are depicted to have the incorrect disparities. For instance, the region 322 is depicted to have an incorrect contour. In the example representation, the regions 326 and 328 are depicted to have the occlusion holes. In an example embodiment, in order to generate a refined disparity map (for example, the third disparity map as explained with reference to FIG. 2), the apparatus 200 is caused to determine disparity values for the incorrect disparity values and for the missing disparities in the disparity map 320. As explained with reference to FIG. 2, for determining the third disparity map, the apparatus 200 is caused to determine the one or more infinity regions present in the image 300 based on the plurality of color segments in the image 300. A determination of the plurality of color segments for the image 300 is explained with reference to FIG. 4.

FIG. 4 illustrates an example representation (shown by 400) of a plurality of color segments associated with the first image 300, in accordance with an example embodiment. It should be noted that the example representation 400 is shown for example purposes only; and its aim is not to represent an accurate color segments associated with the image 300 as shown in FIG. 3A, but to facilitate description of some example embodiments only. As explained with reference to FIG. 2, the 'plurality of color segments' for an image, refers to non-overlapping homogeneous color segments that are segmented based on difference in color intensities between pixels of the first image 300. The example representation 400 is depicted to include some of the color segments of the plurality of color segments, such as color segments 402, 404, 406 and 408. The color segments 402, 404, 406 and 408 are depicted by varying shades in order to distinguish the pixel intensities/color patterns of the color segments 402, 404, 406 and 408. It should be noted that the plurality of color segments may be determined using various techniques including, but not limited to, a mean shift tee based segmentation and a segment tree based segmentation. In an example embodiment, the plurality of color segments may be determined based on an assumption that there are no large disparity discontinuities present within the homogeneous color segments, but such discontinuities may occur on boundaries of the homogeneous color segments.

In an example embodiment, for determining the one or more infinity regions in the first image 300, the plurality of color segments of the first image 300 is determined. In an example embodiment, a first segment tree for the first image 300 and a second segment tree for the second image are determined. In an example, the first segment tree is generated by grouping the pixels of the image 300 into the plurality of color segments, creating a sub-tree for each color segment of the plurality of color segments of the image 300, and linking sub-trees for each of plurality of the color segments in the image 300 to form the first segment tree. Similarly, in this example, the second segment tree is constructed by grouping the pixels of the second image (image I2) into the plurality of color segments of the image I2, creating a sub-tree for each color segment of the plurality of color segments of the image I2, and linking sub-trees for each of plurality of the color segments in the image I2 to form the second segment tree. As explained with reference to FIG. 2, a set of color segments from the plurality of color segments is determined by comparing the sizes of the plurality of color segments with the threshold size, and the one or more color segments from the set of color segments are classified as the one or more infinity regions. In an example embodiment, the apparatus 200 is caused to generate the third disparity map based on the disparity map 320, the information of the one or more infinity regions in the disparity map 320, occlusion pixels in the disparity map 320 and the confidence map generated for the first image 300. The process of generation of the third disparity map is explained with reference to FIGS. 5A and 5B and 6.

Figure 5A:
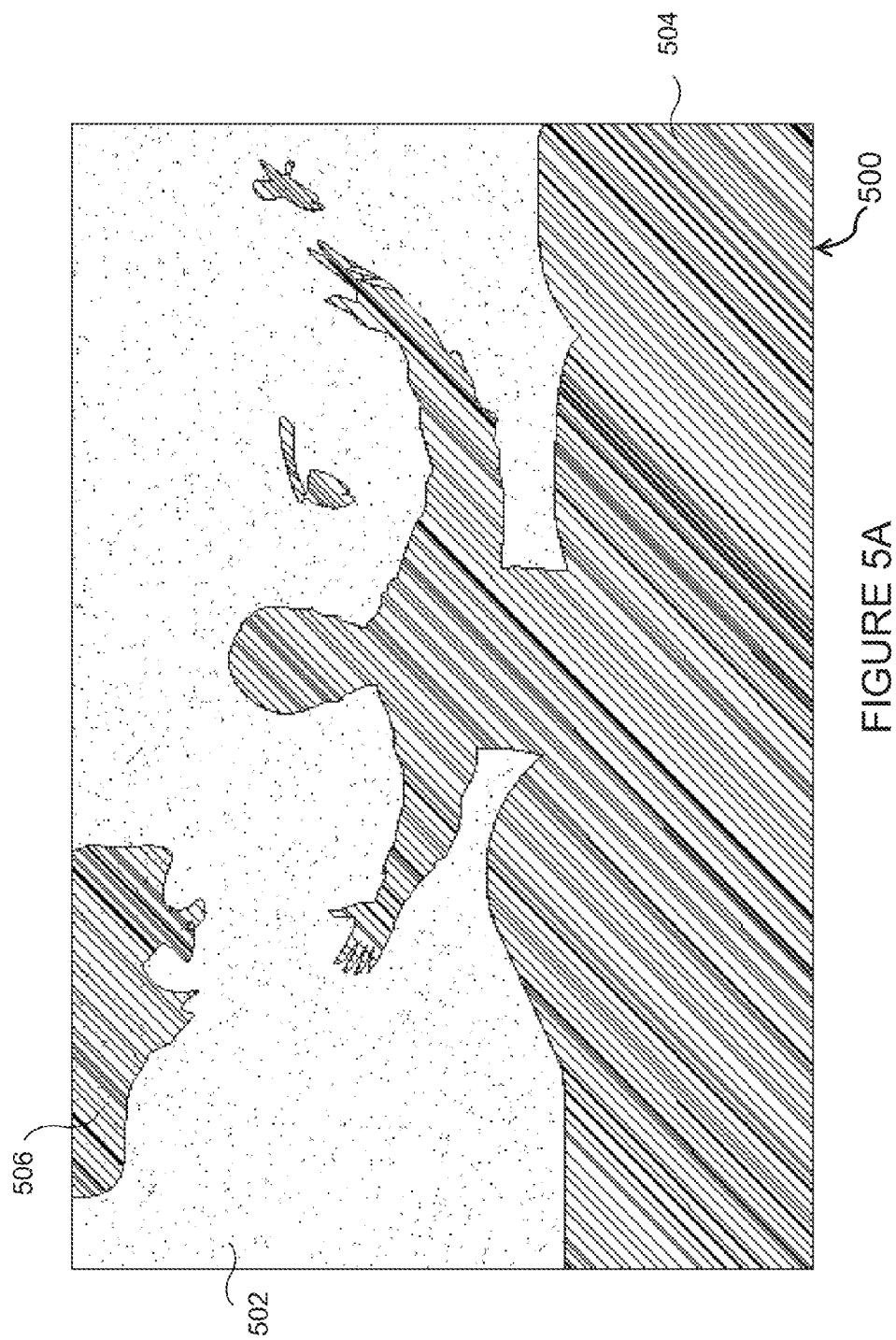
FIG. 5A illustrates an example representation of a binary mask associated with one or more infinity regions, in accordance with an example embodiment.

FIG. 5A illustrates an example representation of a binary mask 500 associated with one or more infinity regions, in accordance with an example embodiment. It should be noted that the binary mask 500 is shown for representation purposes only; and its aim is not to represent an accurate binary mask associated with the image 300 as shown in FIG. 3A, but to facilitate description of some example embodiments only. The binary mask 500 represents the one or more infinity regions in the first disparity map. For instance, the binary mask 500 is depicted to include an infinity region 502 and confident regions 504 and 506. It should be noted that the disparity values for the pixels within the binary mask 500 is set as zero in the third disparity map. The binary mask 500 represents the one or more infinity regions, such as the infinity region 502 and the disparity values of the pixels within the binary mask 500 are set as zero; and hence the pixels of the infinity region 502 have no effect in determining the filtered disparity values of the pixels of the regions 504 and 506. As described with reference to FIG. 2, the filtered disparity values for the other pixels, for example, the pixels belonging to the regions 504 and 506 are determined by performing filtering based on the expression (3) as explained with reference to FIG. 2. The pixels in the infinity region 502 does not have any effect on the filtering process for the pixels of the regions 504 and 506 as the disparity values for the pixels of the infinity region 502 are set as zero.

Figure 5B:
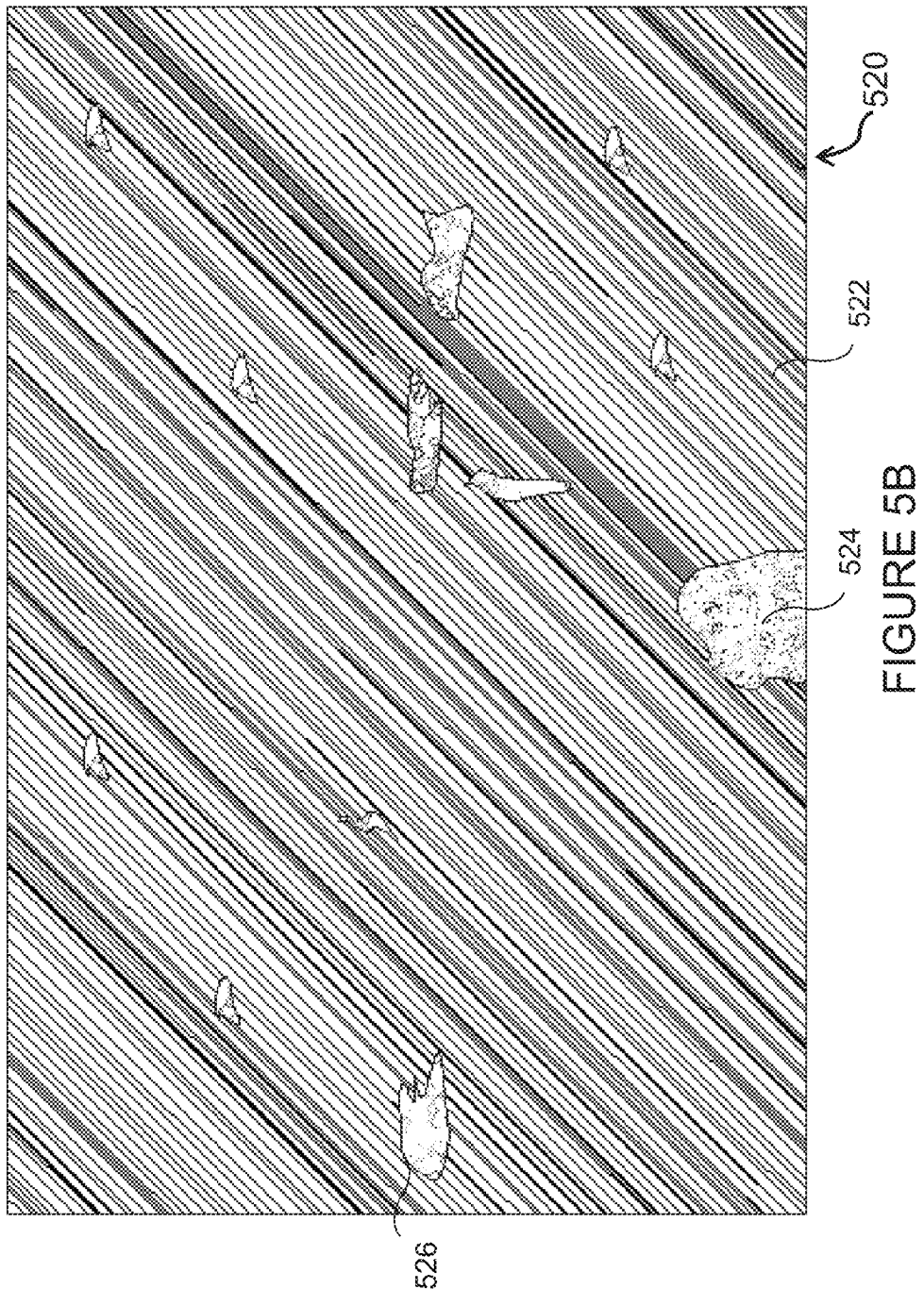
FIG. 5B illustrates an example representation of a binary mask associated with occlusion holes, in accordance with an example embodiment.

FIG. 5B illustrates an example representation of a binary mask 520 associated with occlusion holes as well as the low confident regions, in accordance with an example embodiment. It should be noted that the binary mask 520 is shown for representation purposes only and its aim is not to represent an accurate binary mask associated with the image 300 as shown in FIG. 3A, but to facilitate description of some example embodiments only. The binary mask 520 is depicted to include a region 522 which has valid disparity pixels and a set of occlusion holes, such as a hole 526 and a low confident hole 524. In an example embodiment, the disparity values for the pixels of the holes and low confident holes/pixels are determined based on the expression (3), or by full image guided filtering method. After performing determination of disparities values for the pixels of the first image 300 and filling the occlusion holes/pixels and setting the pre-defined disparity values for pixels belonging to the infinity regions, a refined disparity map, such as the third disparity map (as explained in FIG. 2) is generated. The refined disparity map is shown in FIG. 6.

FIG. 6 illustrates a refined disparity map 600 of the first disparity map, in accordance with an example embodiment. It should be noted that the example representation 600 is shown for example purposes only; and its aim is not to represent an accurate refined disparity map obtained from the first disparity map 320, but to facilitate description of some example embodiments only. The disparity map 600 is depicted to include plurality of regions such as regions 602, 604, 606 and 608. The regions 602, 604, 606 and 608 are depicted to have accurate disparities and the region 602 is depicted to have a consistent contour as compared to the regions 322, 324, 326, and 328 in the disparity map 320 depicted in the FIG. 3B. The disparity map 600 includes infinity regions, such as the region 602 and regions having confident disparity pixels such as the regions 604, 606 and 608. The infinity region such as the region 602 and confident disparity regions such as the regions 604, 606 and 608 are represented by different shades, for the example purposes. The example representation of the disparity map 600 may be generated after performing filtering and the hole filling process as explained with reference to FIG. 2.

Figure 7:
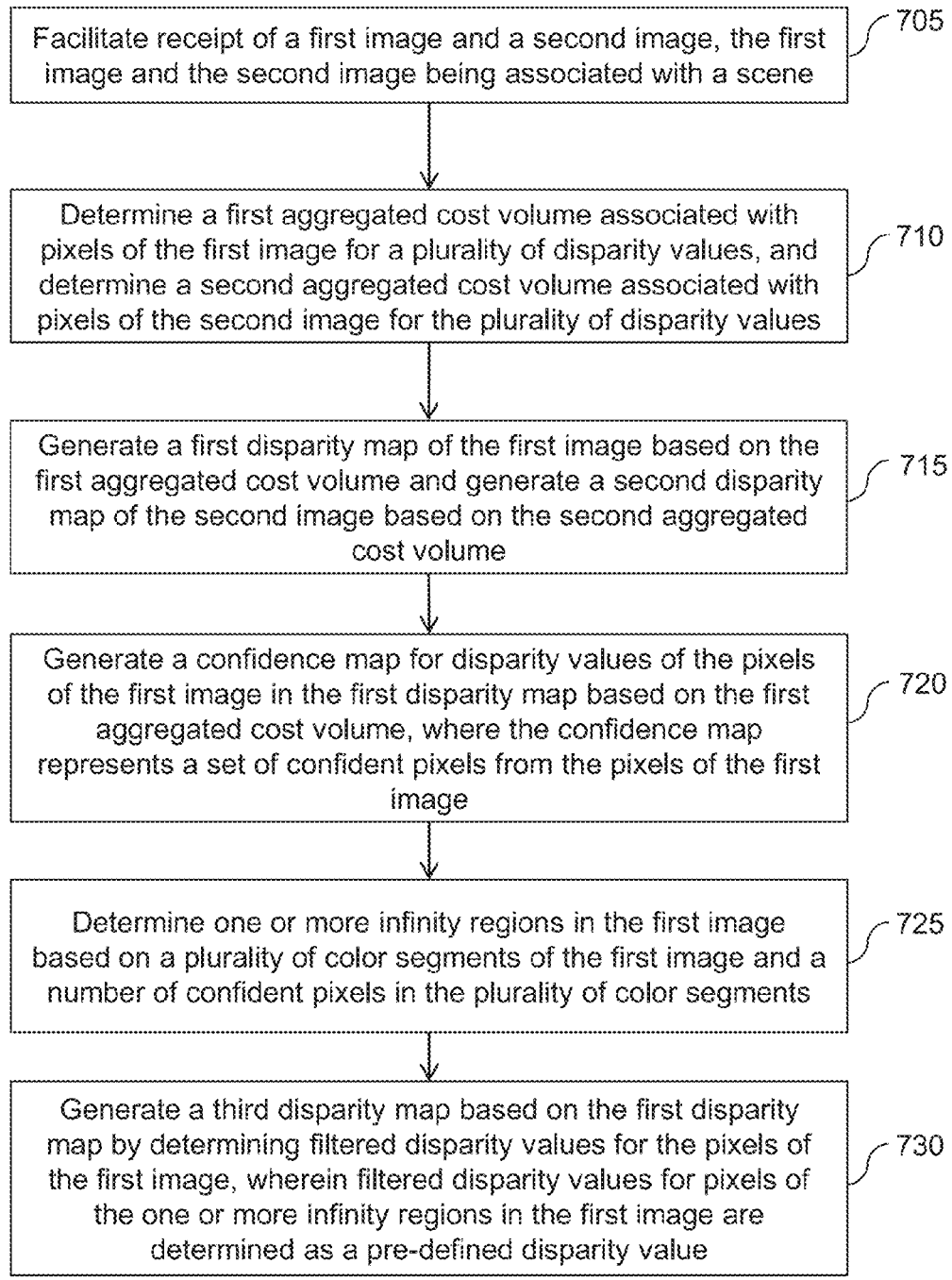
FIG. 7 is a flowchart depicting an example method for disparity map estimation, in accordance with an example embodiment.

FIG. 7 illustrates a flowchart depicting an example method 700 for disparity map estimation, in accordance with an example embodiment. In an example embodiment, the method 700 includes disparity estimation of two images of a scene. Example references are made to FIG. 2 for the description of the method 700. The method 700 depicted in the flow chart may be executed by, for example, the apparatus 200 of FIG. 2.

At 705, the method 700 includes facilitating receipt of a first image and a second image. In an example embodiment, the first image and the second image are associated with a scene, and are stereoscopic pair of images of the scene. The first image and the second image are captured by image sensors, for example, the image sensors 208 and 210.

At 710, the method 700 includes determining a first aggregated cost volume associated with pixels of the first image for a plurality of disparity values, and determining a second aggregated cost volume associated with pixels of the second image for the plurality of disparity values. In an example embodiment, the first aggregated cost volume is determined by computing a cost volume between the pixels of the first image and corresponding pixels of the second image for the plurality of disparity values. In an example embodiment, the cost volume is a set of matching costs for each pixel of the image I1 and the corresponding pixel in the image I2, where each matching cost corresponds to a disparity value (from the plurality of disparity values). In an example embodiment, the cost volume is a set of matching costs for each pixel of the image I2, where each matching cost corresponds to a disparity value (from the plurality of disparity values). In this example embodiment, the cost volume includes n number of matching costs for the corresponding pixels of the images (I1 and/or I2) calculated for n number of disparity values. In an example, a matching cost may refer to a degree of similarity (or distance) between two corresponding pixels in the images I1 and I2, where the degree of similarity (or distance) is measured in terms of intensity, color, or other image features. In an example, the cost volume is computed using a color difference method between the pixels in the first image and the pixels in the second image. In an example embodiment, the cost volume is aggregated based on a first segment tree to generate the first aggregated cost volume for the first image, and the cost volume is aggregated based on a second segment tree to generate the second aggregated cost volume for the second image.

At 715, the method 700 includes generating a first disparity map of the first image based on the first aggregated cost volume and generating a second disparity map of the second image based on the second aggregated cost volume. In an example embodiment, the tree based cost aggregation method is performed on the first image to determine the first aggregated cost volume which outputs the first disparity map. In an example embodiment, the tree based cost aggregation method is performed on the second image to determine the second aggregated cost volume which outputs the second disparity map.

At 720, the method 700 includes generating a confidence map for disparity values of the pixels of the first image in the first disparity map based on the first aggregated cost volume. In an example embodiment, the confidence map represents a set of confident pixels from the pixels of the first image. In an example embodiment, for generating the confidence map, confidence values corresponding to disparity values for the pixels in the first disparity map is determined based on the first aggregated cost volume. In an example embodiment, the confidence map represents confidence values for distinguishing the set of confident pixels and a set of non-confident pixels in the image I1. For instance, the confidence values in the confidence map may be binary values 0 and 1. In an example embodiment, the confident pixels may be assigned with a binary value '1' and the non-confident pixels may be assigned with a binary value '1'.

At 725, the method 700 includes determining one or more infinity regions in the first image based a plurality of color segments of the first image and a number of confident pixels in the plurality of color segments. Examples of the one or more infinity regions may include, but are not limited to, low texture regions or textureless regions associated with the scene, such as sky, plain walls and the like. In an example embodiment, the term 'infinity region' may also refer to a region in the image where pixels associated with this region maybe considered to have zero disparity values. For instance, if in a color segment of the plurality of color segments, a number of confident pixels are more than a threshold percentage of total pixels in the color segment, color segment may be determined as an infinity region.

At 730, the method 700 includes generating a third disparity map based on the first disparity map. In an example embodiment, the third disparity map is a refined disparity map (as depicted in FIG. 6) obtained based on the first disparity map. In an example embodiment, the method 700 includes determining filtered disparity values for the pixels of the first image. In an example embodiment, filtered disparity values for those pixels of the first image that are part of the one or more infinity regions, are determined as equal to a pre-determined disparity value (for example zero disparity value). In an example embodiment, filtered disparity values for the pixels (that are other than the pixels in the one or more infinity regions) of the first image are calculated based on a tree based aggregation method as described with reference to FIG. 2, for example, based on the expression (3). In another example embodiment, the method 700 includes determining filtered disparity values for the pixels (other than the pixels belonging to the one or more infinity regions) of the first image based on the full image guided filtering method as described with reference to FIG. 2, whereas filtered disparity values for pixels of the one or more infinity regions in the first image are assigned with the pre-defined disparity value (for example, zero disparity value).

Figure 8A:
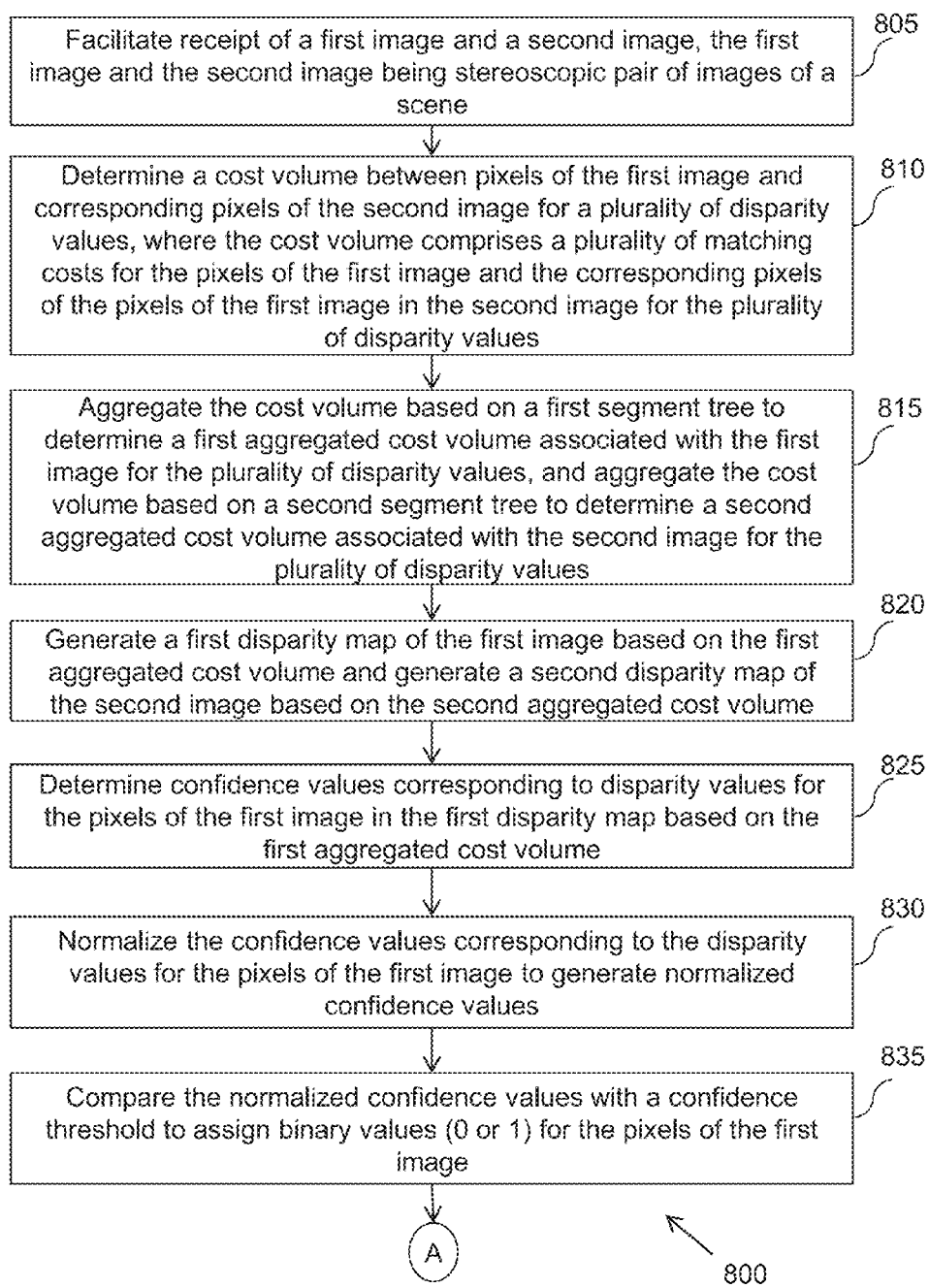
FIGS. 8A and 8B are a flowchart depicting an example method for disparity map estimation, in accordance with another example embodiment.
Figure 8B:
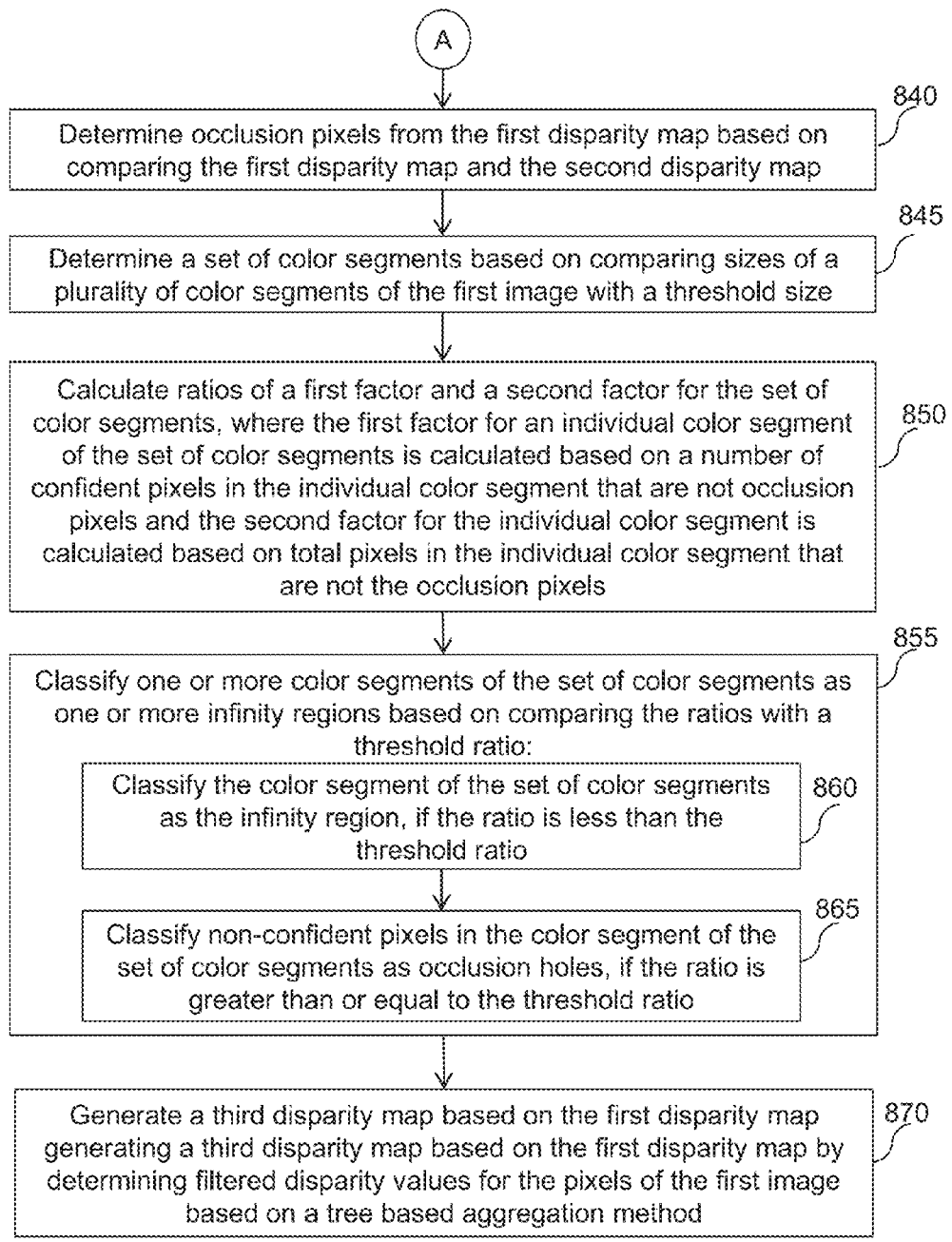

FIGS. 8A and 8B illustrate flowcharts depicting an example method 800 for disparity map estimation, in accordance with another example embodiment. Example references are made to FIG. 2 for the description of the method 800. The method 800 depicted in the flow chart may be executed by, for example, the apparatus 200 of FIG. 2.

At 805, the method 800 includes facilitating receipt of a first image and a second image. In an example embodiment, the first image and the second image are stereoscopic pair of images of a scene. In an example, the first image is captured by a first image sensor (for example, the sensor 208) and the second image is captured by a second image sensor (for example, the sensor 210).

At 810, the method 800 includes determining a cost volume between pixels of the first image and corresponding pixels of the second image for the plurality of disparity values (d1, d2 . . . dn). In an example embodiment, the cost volume includes a plurality of matching costs for pixels of the first image and corresponding pixels of the pixels of the first image in the second image for the plurality of disparity values d1, d2 . . . dn.

At 815, the method 800 includes aggregating the cost volume based on a first segment tree to determine the first aggregated cost volume associated with the first image for the plurality of disparity values, and aggregating the cost volume based on a second segment tree to determine a second aggregated cost volume associated with the second image for the plurality of disparity values (d1, d2, . . . dn). An example of the operations of the blocks 810 and 815 is the operation performed at the block 710.

At 820, the method 800 includes generating a first disparity map of the first image based on the first aggregated cost volume and further includes generating a second disparity map of the second image based on the second aggregated cost volume. In this example, the first disparity map of the first image and the second disparity map of the second image are generated using the cost aggregation method. An example of the operation of the block 820 is the operation performed at the block 715.

At 825, the method 800 includes determining confidence values corresponding to disparity values for the pixels of the first image in the first disparity map based on the first aggregated cost volume. At 830, the method 800 includes normalizing the confidence values to generate normalized confidence values. At 835, the method 800 includes comparing the normalized confidence values with the confidence threshold to assign a binary confidence value (for example, 0 or 1) for the pixels in the first disparity map. Some examples of determining confidence values, normalizing the confidence values and assigning the binary confidence values are explained with reference to FIG. 2. For instance, some pixels that are confident pixels may be assigned with the binary confidence value of '1', and whereas the non-confident pixels are assigned with the binary confidence value of '0'.

At 840, the method 800 includes determining occlusion pixels in the first disparity map based on comparing the first disparity map and the second disparity map. In this example the pixels from the first disparity map and the pixels from the second disparity map are subjected to a mutual consistency check (also referred to as a left right (LR) check) to determine the occlusion pixels.

At 845, the method 800 includes determining a set of color segments based on comparing sizes of a plurality of color segments with a threshold size. In this example, the plurality of color segments of the first image is computed based on a variety of suitable segmentation methods known in the art. In an example embodiment, color segmentation of an image refers to a process where the pixels having same intensity value are grouped together to a form a segment and each segment is represented by a color. The plurality of color segments may be determined by various suitable techniques, such as, but are not limited to, a mean shift tree (MST) based segmentation, a segment tree based segmentation and the like. In an example, the threshold size may be 2% of size of the first image. The threshold size (2%) is mentioned only as a representation purpose and should not be considered as limiting as the threshold size may be of any value. In an example embodiment, the method 800 comprises comparing each color segment of the plurality of color segments with the threshold size to check whether the sizes of the plurality of color segments is higher than the threshold size or not. If the size of a color segments is higher than the threshold size, the color segment is selected as a part of the set of color segments.

At 850, the method 800 includes calculating a ratio (T) of a first factor and a second factor for the set of color segment of the first image. In an example embodiment, the first factor ($C_N$) for an individual color segment of the set of color segments is calculated based on the number of confident pixels in the individual color segment that are not occlusion pixels and the second factor ($S_N$) is calculated based on total pixels in the individual color segment that are not the occlusion pixels. Some examples of the ratio of the first factor and the second factor are explained with reference to FIG. 2. At 850, the ratios (T) of the first factor and the second factor are calculated for all color segments of the set of color segments.

At 855, the method 800 includes classifying one or more color segments of the set of color segments as the one or more infinity regions based on comparing the ratios with a threshold ratio. The ratios for the set of color segments are compared with the threshold ratio to check whether the ratios are lower than the threshold ratio or not. In an example embodiment, the operation of the block 855 includes performing operations of blocks 860 and 865 for each color segment of the set of color segments. At 860, a color segment of the set of color segments is classified as the 'infinity region', if the ratio for the color segment is less than the threshold ratio. Disparity values for pixels of the one or more infinity regions in the first image are set as equal to a pre-defined disparity value. At 865, the method 800 includes classifying the non-confident pixels in the set of color segments as occlusion holes/pixels, if the ratio for the color segment is greater than or equal to the threshold ratio. It should be understood that if the ratio T is greater than or equal to the threshold ratio, then the selected color segment is considered to have more number of confident pixels as compared to non-confident pixels, and thereby whole color segment is not classified as the infinity regions, but only the non-confident pixels are classified as the occlusion holes or pixels.

At 870, the method 800 includes generating a third disparity map for the first disparity map. The operation 870 is an example of the operation performed by the block 730. At 870, the method 800 includes determining disparity values for the pixels of the first image based on a tree based aggregation method, for example, as based on the expression (3) as explained with reference to FIG. 2. In an example embodiment, at 870, the method 800 includes determining filtered disparity values for the pixels of the first image. In an example embodiment, filtered disparity values for those pixels of the first image that are part of the one or more infinity regions, are determined as equal to a pre-determined disparity value (for example zero disparity value), and filtered disparity values for the pixels (that are other than the pixels in the one or more infinity regions) of the first image are calculated based on a tree based aggregation method as described with reference to FIG. 2, for example, based on the expression (3). In another example embodiment, the method 800 may include determining the filtered disparity values for the pixels (other than the pixels belonging to the one or more infinity regions) of the first image based on the full image guided filtering method as described with reference to FIG. 2, instead of the tree based aggregation method.

It should be noted that to facilitate discussions of the flowcharts of FIGS. 7 and 8A-8B certain operations are described herein as constituting distinct steps performed in a certain order. Such implementations are examples only and non-limiting in scope. Certain operation may be grouped together and performed in a single operation, and certain operations can be performed in an order that differs from the order employed in the examples set forth herein. Moreover, certain operations of the methods 700 and 800 are performed in an automated fashion. These operations involve substantially no interaction with the user. Other operations of the methods 700 and 800 may be performed by in a manual fashion or semi-automatic fashion. These operations involve interaction with the user via one or more user interface presentations.

The methods depicted in these flow charts may be executed by, for example, the apparatus 200 of FIG. 2. Operations of the flowchart, and combinations of operation in the flowcharts, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus, provide operations for implementing the operations in the flowchart. The operations of the methods are described with help of apparatus 200. However, the operations of the methods can be described and/or practiced by using any other apparatus.

Without in any way limiting the scope, interpretation, or application of the claims appearing below, a technical effect of one or more of the example embodiments disclosed herein is to improve disparity estimation of stereo images. Various example embodiments are capable of correcting incorrect disparities by performing fast filtering of the disparity map. Various example embodiments are capable of filling missing disparities such as occlusion holes and concurrently performing one pass filtering for determining the refined disparity values for the pixels of the image. Various example embodiments are capable of performing disparity estimation by precluding influence of textureless areas in the image for estimation of the disparity values for pixels of other regions in the image, thereby making the disparity estimation more robust.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

The invention claimed is:

1. A method comprising:
    facilitating receipt of a first image and a second image, the first image and the second image being associated with a scene;
    determining, by a processor, a first aggregated cost volume associated with pixels of the first image for a plurality of disparity values, and determining a second aggregated cost volume associated with pixels of the second image for the plurality of disparity values;
    generating a first disparity map of the first image based on the first aggregated cost volume and generating a second disparity map of the second image based on the second aggregated cost volume;
    generating a confidence map for disparity values of the pixels of the first image in the first disparity map based on the first aggregated cost volume, the confidence map representing a set of confident pixels from the pixels of the first image;
    determining one or more infinity regions in the first image based at least on a plurality of color segments of the first image and a number of confident pixels in the plurality of color segments; and
    generating a third disparity map based on the first disparity map by determining filtered disparity values for the pixels of the first image, wherein filtered disparity values for pixels of the one or more infinity regions in the first image are determined as a pre-defined disparity value.

2. The method as claimed in claim 1, further comprising:
    determining a cost volume between the pixels of the first image and corresponding pixels of the second image for the plurality of disparity values, wherein the cost volume comprises a plurality of matching costs for the pixels of the first image and the corresponding pixels of the pixels of the first image in the second image for the plurality of disparity values,
    wherein the cost volume is aggregated based on a first segment tree to determine the first aggregated cost volume and wherein the cost volume is aggregated based on a second segment tree to determine the second aggregated cost volume.

3. The method as claimed in claim 1, wherein generating the confidence map comprises:
    determining confidence values corresponding to the disparity values for the pixels of the first image in the first disparity map based on the first aggregated cost volume;
    normalizing the confidence values corresponding to the disparity values for the pixels of the first image to generate normalized confidence values; and
    comparing the normalized confidence values with a confidence threshold to assign a binary confidence value to the pixels of the first image, wherein if a normalized confidence value for a pixel of the first image is more than the confidence threshold, the binary confidence value for the pixel is assigned as '0', and wherein if the normalized confidence value for the pixel of the first image is less than or equal to the confidence threshold, the binary confidence value for the pixel is assigned as '1'.

4. The method as claimed in claim 1, wherein determining the one or more infinity regions in the first image further comprises:
    determining occlusion pixels in the first disparity map based on comparing the first disparity map and the second disparity map; and
    defining the one or more infinity regions based on sizes of the plurality of color segments of the first image, the number of confident pixels and a number of occlusion pixels in the plurality of color segments.

5. The method as claimed in claim 4, wherein defining the one or more infinity regions comprises:
    determining a set of color segments of the plurality of color segments based on comparing the sizes of the plurality of color segments with a threshold size;

calculating ratios of a first factor and a second factor for the set of color segments, wherein the first factor for an individual color segment of the set of color segments is calculated based on a number of confident pixels in the individual color segment that are not occlusion pixels and the second factor for the individual color segment is calculated based on total pixels in the individual color segment that are not the occlusion pixels; and classifying one or more color segments of the set of color segments as the one or more infinity regions based on comparing the ratios with a threshold ratio.

6. The method as claimed in claim 5, wherein classifying a color segment of the set of color segments as an infinity region of the one or more infinity regions comprises:

comparing the ratio for the color segment of the set of color segments with the threshold ratio and performing one of:
classifying the color segment of the set of color segments as the infinity region, if the ratio is less than the threshold ratio; and
classifying non-confident pixels in the color segment of the set of color segments as occlusion holes, if the ratio is greater than or equal to the threshold ratio.

7. The method as claimed in claim 2, wherein a filtered disparity value for a pixel of the first image is determined based on an expression:

$$d_p = \frac{1}{N_p} \sum_{q \in I} e^{-\frac{D(p,q)}{\sigma}} d_q b_q,$$

where $d_p$ is the filtered disparity value for a pixel p of the first image, $d_q$ is disparity value for a pixel q of the first image, $D(p,q)$ is a distance between the pixel p and the pixel q in the first segment tree, $b_q$ is a binary confidence value of the pixel q associated with the confidence map, $N_p$ is a normalizing term for the pixel p and $\sigma$ is a constant.

8. The method as claimed in claim 1, wherein the pre-defined disparity value is a zero disparity value.

9. The method as claimed in claim 1, wherein the first image and the second image are stereoscopic pair of images of the scene.

10. An apparatus comprising:
at least one processor; and
at least one memory comprising computer program code, the at least one memory and the computer program code configured to, with the at least one processor, cause the apparatus to at least perform:
facilitate receipt of a first image and a second image, the first image and the second image being associated with a scene;
determine a first aggregated cost volume associated with pixels of the first image for a plurality of disparity values, and determining a second aggregated cost volume associated with pixels of the second image for the plurality of disparity values;
generate a first disparity map of the first image based on the first aggregated cost volume and generating a second disparity map of the second image based on the second aggregated cost volume;
generate a confidence map for disparity values of the pixels of the first image in the first disparity map based on the first aggregated cost volume, the confidence map representing a set of confident pixels from the pixels of the first image;

determine one or more infinity regions in the first image based at least on a plurality of color segments of the first image and a number of confident pixels in the plurality of color segments; and
generate a third disparity map based on the first disparity map by determining filtered disparity values for the pixels of the first image, wherein filtered disparity values for pixels of the one or more infinity regions in the first image are determined as a pre-defined disparity value.

11. The apparatus as claimed in claim 10, wherein the apparatus is further caused, at least in part to:
determine a cost volume between the pixels of the first image and corresponding pixels of the second image for the plurality of disparity values, wherein the cost volume comprises a plurality of matching costs for the pixels of the first image and the corresponding pixels of the pixels of the first image in the second image for the plurality of disparity values,
wherein the cost volume is aggregated based on a first segment tree to determine the first aggregated cost volume and wherein the cost volume is aggregated based on a second segment tree to determine the second aggregated cost volume.

12. The apparatus as claimed in claim 10, wherein for generating the confidence map, the apparatus is further caused, at least in part to:
determine confidence values corresponding to the disparity values for the pixels of the first image in the first disparity map based on the first aggregated cost volume;
normalize the confidence values corresponding to the disparity values for the pixels of the first image to generate normalized confidence; and
compare the normalized confidence values with a confidence threshold to assign a binary confidence value to the pixels of the first image, wherein if a normalized confidence value for a pixel of the first image is more than the confidence threshold, the binary confidence value for the pixel is assigned as '0', and wherein if the normalized confidence value for the pixel of the first image is less than or equal to the confidence threshold, the binary confidence value for the pixel is assigned as '1'.

13. The apparatus as claimed in claim 10, wherein for determining the one or more infinity regions in the first image, the apparatus is further caused, at least in part to:
determine occlusion pixels in the first disparity map based on comparing the first disparity map and the second disparity map; and
defining the one or more infinity regions based on sizes of the plurality of color segments of the first image, the number of confident pixels and a number of occlusion pixels in the plurality of color segments.

14. The apparatus as claimed in claim 13, wherein for defining the one or more infinity regions, the apparatus is further caused, at least in part to:
determine a set of color segments of the plurality of color segments based on comparing the sizes of the plurality of color segments with a threshold size;
calculate ratios of a first factor and a second factor for the set of color segments, wherein the first factor for an individual color segment of the set of color segments is calculated based on a number of confident pixels in the individual color segment that are not occlusion pixels and the second factor for the individual color segment is calculated based on total pixels in the individual color segment that are not the occlusion pixels; and classify one or more color segments of the set of color segments as the one or more infinity regions based on comparing the ratios with a threshold ratio.

15. The apparatus as claimed in claim 14, wherein for classifying a color segment of the set of color segments as an infinity region of the one or more infinity regions, the apparatus is further caused, at least in part to:
compare the ratio for the color segment of the set of color segments with the threshold ratio and perform one of:
classify the color segment of the set of color segments as the infinity region, if the ratio is less than the threshold ratio; and
classify non-confident pixels in the color segment of the set of color segments as occlusion holes, if the ratio is greater than or equal to the threshold ratio.

16. The apparatus as claimed in claim 10, wherein the pre-defined disparity value is a zero disparity value.

17. The apparatus as claimed in claim 10, wherein the first image and the second image are stereoscopic pair of images of the scene.

18. A computer program product comprising at least one non-transitory computer-readable storage medium, the non-transitory computer-readable storage medium comprising a set of instructions, which, when executed by one or more processors, cause an apparatus to at least perform:
facilitate receipt of a first image and a second image, the first image and the second image being associated with a scene;
determine a first aggregated cost volume associated with pixels of the first image for a plurality of disparity values, and determining a second aggregated cost volume associated with pixels of the second image for the plurality of disparity values;
generate a first disparity map of the first image based on the first aggregated cost volume and generating a second disparity map of the second image based on the second aggregated cost volume;
generate a confidence map for disparity values of the pixels of the first image in the first disparity map based on the first aggregated cost volume, the confidence map representing a set of confident pixels from the pixels of the first image;
determine one or more infinity regions in the first image based at least on a plurality of color segments of the first image and a number of confident pixels in the plurality of color segments; and
generate a third disparity map based on the first disparity map by determining filtered disparity values for the pixels of the first image, wherein filtered disparity values for pixels of the one or more infinity regions in the first image are determined as a pre-defined disparity value.

19. The computer program product as claimed in claim 18, wherein the apparatus is further caused, at least in part to:
determine a cost volume between the pixels of the first image and corresponding pixels of the second image for the plurality of disparity values, wherein the cost volume comprises a plurality of matching costs for the pixels of the first image and the corresponding pixels of the pixels of the first image in the second image for the plurality of disparity values,
wherein the cost volume is aggregated based on a first segment tree to determine the first aggregated cost volume and wherein the cost volume is aggregated based on a second segment tree to determine the second aggregated cost volume.

20. The computer program product as claimed in claim 18, wherein for determining the one or more infinity regions in the first image, the apparatus is further caused, at least in part to:
determine occlusion pixels in the first disparity map based on comparing the first disparity map and the second disparity map; and
defining the one or more infinity regions based on sizes of the plurality of color segments of the first image, the number of confident pixels and a number of occlusion pixels in the plurality of color segments.

21. The computer program product as claimed in claim 20, wherein for defining the one or more infinity regions, the apparatus is further caused, at least in part to:
determine a set of color segments of the plurality of color segments based on comparing the sizes of the plurality of color segments with a threshold size;
calculate ratios of a first factor and a second factor for the set of color segments, wherein the first factor for an individual color segment of the set of color segments is calculated based on a number of confident pixels in the individual color segment that are not occlusion pixels and the second factor for the individual color segment is calculated based on total pixels in the individual color segment that are not the occlusion pixels; and
classify one or more color segments of the set of color segments as the one or more infinity regions based on comparing the ratios with a threshold ratio.

22. The computer program product as claimed in claim 21, wherein for classifying a color segment of the set of color segments as an infinity region of the one or more infinity regions, the apparatus is further caused, at least in part to:
compare the ratio for the color segment of the set of color segments with the threshold ratio and perform one of:
classifying the color segment of the set of color segments as the infinity region, if the ratio is less than the threshold ratio; and
classifying non-confident pixels in the color segment of the set of color segments as occlusion holes, if the ratio is greater than or equal to the threshold ratio.

* * * * *